(No Model.)
H. O. BROOKS.
ODOMETER.
No. 326,396. Patented Sept. 15, 1885.
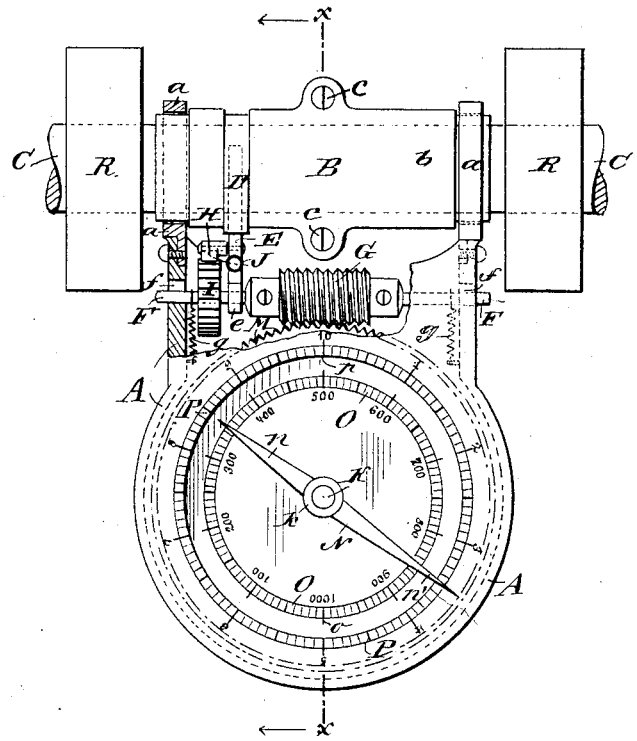
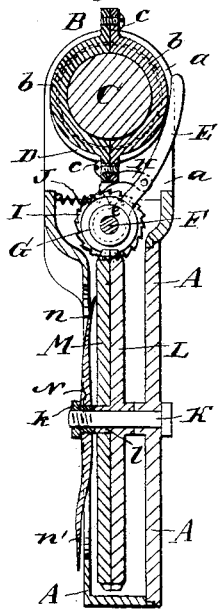
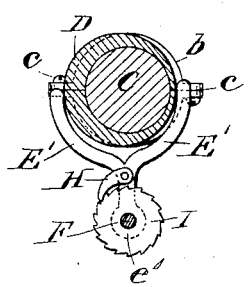
WITNESSES:
INVENTOR:
H. O. Brooks
BY
ATTORNEYS.

United States Patent Office.

HENRY ORVILLE BROOKS, OF LOWELL, MASSACHUSETTS.

ODOMETER.

SPECIFICATION forming part of Letters Patent No. 326,396, dated September 15, 1885.

Application filed November 28, 1884. (No model.)

*To all whom it may concern:*

Be it known that I, HENRY ORVILLE BROOKS, of Lowell, in the county of Middlesex and State of Massachusetts, have invented a new and Improved Odometer, of which the following is a full, clear, and exact description.

The object of my invention is to provide a simple, inexpensive odometer of improved construction for attachment to bicycles, tricycles, cars, or other vehicles to measure the distance traveled by them.

The invention consists in the construction and arrangement of parts, as will be hereinafter fully described, and specifically set forth in the claims.

Reference is to be had to the accompanying drawings, forming part of this specification, in which similar letters of reference indicate corresponding parts in all the figures.

Figure 1 shows my improved odometer in sectional front elevation and as suspended from the axle of a bicycle or other vehicle to measure the distance traveled thereby. Fig. 2 is a transverse vertical section taken on the line $x\ x$, Fig. 1; and Fig. 3 illustrates a modification of the pawl and ratchet mechanism for turning the worm-wheels and pointer of the odometer.

The letter A indicates the case of the odometer, which has attached to its upper end the rings or hangers $a\ a$, which are placed loosely on the elongated collar B, which is made in halves, $b\ b$, bound upon the axle C of the vehicle by screws $c\ c$, passing through lugs of the split collar, so that the collar revolves with the axle and the odometer hangs loosely from the collar. The split construction of the collar allows it to be tightened upon axles of varying diameters, so that the instrument may be attached to any one of a class of vehicles.

On the collar B is formed or fixed a cam, D, which, as the axle and collar revolve, forces back the arm E, which is hung loosely by an eye, $e$, upon the shaft F of the worm G, and to the arm E is pivoted the pawl H, which engages the teeth of a ratchet-wheel I, fixed on the worm-shaft F. The cam D carries the pawl H back to allow it to engage the next tooth of the ratchet I, and a spring J, fastened to the arm E and to the case A of the instrument, carries the pawl forward to turn the ratchet I, and with it the worm G.

It may be preferred at times to use the pawl and ratchet mechanism of Fig. 3, wherein the lever E', hung by its eye $e'$ on the shaft F, has opposite arms embracing the cam, and the pawl H is pivoted to the lever and is moved forward to turn the ratchet-wheel I, and is drawn back also by the positive movements given the lever by the cam.

Any suitable brake or friction device may be arranged to act on the ratchet-wheel I to prevent a shifting of the wheel except by the pawl.

On a pin, K, held in the case A, is journaled the worm-wheel L, which has a central boss, $l$, on which is mounted the worm-wheel M, in front of which, on the pin K, is placed a hand or pointer, N, one arm, $n$, of which moves over a dial or scale, O, marked on the face of the outer wheel, M, and its other arm, $n'$, is bent upward to move over an outer dial or scale, P, formed around the face-opening of the case A. A nut, $k$, screwed on the pin K, holds the wheels L M and pointer N to the case.

The dial O indicates hundreds of miles and tens of miles up to one thousand miles, and the dial P indicates miles and tenths of miles up to ten miles.

Both of the wheels L M are normally in gear with the worm G, and the wheel L, with which the pointer N turns synchronously, has ninety-nine teeth, and the outer wheel, M, having the long-distance dial O, has one hundred teeth, or one tooth more than the wheel L.

The worm and worm-wheels may be relatively arranged in any approved way to allow the pointer N and wheel M to be turned to bring the zero-marks $o\ p$ of the dials O P beneath the opposite ends of the pointer—as, for instance, by fitting the worm-shaft F into the slots $f\ f$ of the case A, so that one or both ends of the shaft may be raised to throw the worm G out of gear with the wheel M, springs $g\ g$ being attached to the worm-shaft and case A to hold the worm normally in gear with the wheels L M, as will be understood from Fig. 1.

The letters R R indicate the hub parts of the wheel of a bicycle to which the odometer is attached.

The operation is as follows: The pointer N is adjusted at the zero-marks on the dials at the commencement of a trip or journey, and for each revolution of the axle C the cam D will throw the pawl H to turn the ratchet-wheel I the distance of one tooth, which turns the worm G, and through it the wheels L M and pointer N, and, the gearing of the instrument being proportioned to the size or circumference of the wheel of the vehicle on the axle C, when the pointer N has turned around once it shall have indicated a distance of ten miles on the outer dial, P; but as the rear wheel, L, has one tooth less than the front wheel, M, said wheel L and the pointer will advance on the wheel M or overrun it the distance of one of the ten-mile scale-marks of the dial O on the outer wheel, M, and the action will be the same for every ten miles traveled, so that each successive ten miles will be indicated by the end $n$ of the pointer at the dial O, as the end $n'$ of the pointer passes the zero-mark $p$ of the dial P, and so on until a complete revolution of the end $n$ of the pointer with reference to the dial O will indicate a distance traveled of one thousand miles.

If a pointer having one end only is employed, the zero-marks of both dials O P will be in line with each other at the same side of the instrument.

The distance between certain places along the road being known, the names of the places—cities and towns, for instance—may be marked on the dials so that the instrument shall indicate the places passed or ahead of it on the journey, as will readily be understood.

It is evident that the worm G may be operated by devices on a rotating wheel when the odometer is held to a fixed axle of a carriage or other vehicle to register the distance traveled by it.

Having thus described my invention, what I claim as new, and desire to secure by Letters Patent, is—

1. As an improved article of manufacture, an odometer consisting, essentially, of the sleeve B, having a cam, D, the case A, provided with hangers $a$, loosely suspended from the sleeve, the horizontal shaft F, journaled in the upper end of the casing and provided with the ratchet-wheel I and the worm G, the upward-extending lever journaled loosely upon shaft F, and provided with a pawl, H, engaging the ratchet-wheel, as described, the differentially-toothed wheels L M, journaled in the case and engaging the worm-wheel, the pointer N, secured to the hub of the wheel L, and the dials O P on the wheel M and case A, respectively, substantially as set forth.

2. In an odometer, the casing A, having elongated bearing-slots F, the worm-shaft F, mounted therein and having the worm G, and the spring $g$, connected to the shaft and to the case below the shaft, in combination with the wheels L M, all constructed and arranged substantially as set forth.

HENRY ORVILLE BROOKS.

Witnesses:
 A. W. HUNKING,
 W. E. BADGER.